US 9,225,535 B2

(12) United States Patent
Brock

(10) Patent No.: US 9,225,535 B2
(45) Date of Patent: *Dec. 29, 2015

(54) SYSTEM AND METHOD FOR CONSERVING POWER IN LINK AGGREGATION GROUPS

(71) Applicant: DELL PRODUCTS L.P., Round Rock, TX (US)

(72) Inventor: Kenneth W. Brock, San Jose, CA (US)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/533,944

(22) Filed: Nov. 5, 2014

(65) Prior Publication Data

US 2015/0063125 A1    Mar. 5, 2015

Related U.S. Application Data

(63) Continuation of application No. 13/715,840, filed on Dec. 14, 2012, now Pat. No. 8,908,532.

(51) Int. Cl.
| | |
|---|---|
| *H04L 12/12* | (2006.01) |
| *H04L 12/803* | (2013.01) |
| *H04L 12/801* | (2013.01) |
| *H04L 12/46* | (2006.01) |

(52) U.S. Cl.
CPC ............. *H04L 12/12* (2013.01); *H04L 47/125* (2013.01); *H04L 12/4625* (2013.01); *H04L 47/14* (2013.01); *Y02B 60/33* (2013.01); *Y02B 60/34* (2013.01)

(58) Field of Classification Search
CPC ......... H04L 12/12; H04L 45/00; H04L 47/10; H04L 47/14; H04L 47/125
USPC ......................... 370/230–465; 709/231–235
See application file for complete search history.

(56) References Cited

U.S. PATENT DOCUMENTS

| | | | |
|---|---|---|---|
| 8,140,868 B2* | 3/2012 | Felter et al. ................... 713/300 |
| 2007/0286222 A1* | 12/2007 | Balasubramanian ......... 370/412 |
| 2008/0101230 A1* | 5/2008 | Liu et al. ...................... 370/235 |
| 2008/0270622 A1* | 10/2008 | Gupta et al. .................. 709/231 |
| 2011/0022859 A1* | 1/2011 | More et al. .................... 713/300 |
| 2012/0063353 A1* | 3/2012 | Schlenk et al. ............... 370/253 |
| 2013/0003559 A1* | 1/2013 | Matthews ..................... 370/241 |

\* cited by examiner

*Primary Examiner* — Afsar M Qureshi
(74) *Attorney, Agent, or Firm* — Haynes and Boone, LLP

(57) ABSTRACT

A system and method of reducing power consumption in a network switching unit includes detecting whether conditions are suitable for reducing power consumption in a first network switching unit. The first network switching unit includes a link aggregation group (LAG) and a plurality of communication ports, each communication port configured to couple the first network switching unit to a second network switching unit using a corresponding network link selected from a plurality of network links, and wherein the plurality of network links are assigned to the LAG. The system and method further includes requesting network link deactivation by sending a link deactivation request to the second network switching unit, determining whether the link deactivation request is approved, determining a first network link selected from the plurality of network links to deactivate, deactivating the first network link from use by the LAG, and reducing power supplied to the first network link.

20 Claims, 6 Drawing Sheets

SYSTEM AND METHOD FOR CONSERVING POWER IN LINK AGGREGATION GROUPS

CROSS-REFERENCE TO RELATED APPLICATIONS

This application is a continuation of U.S. patent application Ser. No. 13/715,840, filed Dec. 14, 2012, which is hereby incorporated by reference in its entirety.

BACKGROUND

The present disclosure relates generally to conserving power in link aggregation groups.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are both in close proximity to each other and at distant locations. These networks create a vast spider web of intranets and internets for handling all types of communication and information. Making all of this possible is a vast array of network switching products that make routing decisions in order to deliver packets of information from a source system or first network node to a destination system or second network node. Due to the size, complexity, and dynamic nature of these networks, sophisticated network switching products are often required to implement the interconnection fabric. This can be further complicated through other networking trends such as network virtualization.

Many networks utilize parallelization and other techniques to improve the routing function between two network nodes. By employing parallelization, redundancy is built into a network so that it is possible that more than one path exists between any two nodes. This provides suitably aware network switching products with the ability to select between the redundant paths to avoid network congestion, balance network loads, and/or to avoid failures in the network. Parallelization also provides the ability to handle more network traffic between two nodes than is possible when parallelization is not utilized. In some implementations the parallelization is treated in a more formalized fashion in the form of link aggregation groups (LAGs), in which multiple network links are often bundled into a group to support the parallelization function. For suitably aware network switching products, the LAG can offer a flexible option to select any of the network links in the LAG for routing network traffic towards the next node in the path towards the traffic's final destination. And while LAGs offer additional flexibility in network topologies, they may also add complexity to the routing function and management of the network switching products to which they are attached. And as each network link added to a LAG may increase the quantity of network traffic that can be handled by the LAG, it may also add to the power consumption of both network switching products associated with the network link.

Accordingly, it would be desirable to provide improved network switching products that can dynamically activate and deactivate network links within a LAG to reduce the power consumption of the associated network switching products.

SUMMARY

According to one embodiment, a method of reducing power consumption in a network switching unit includes detecting whether conditions are suitable for reducing power consumption in a first network switching unit. The first network switching unit includes a link aggregation group (LAG) and a plurality of communication ports, each communication port configured to couple the first network switching unit to a second network switching unit using a corresponding network link selected from a plurality of network links, and wherein the plurality of network links are assigned to the LAG. The method further includes requesting network link deactivation by sending a link deactivation request to the second network switching unit, determining whether the link deactivation request is approved, determining a first network link selected from the plurality of network links to deactivate, deactivating the first network link from use by the LAG, and reducing power supplied to the first network link.

According to another embodiment, a method of reducing power consumption in a network switching unit includes receiving a link deactivation request by a first network switching unit from a second network switching unit. The first network switching unit includes a link aggregation group (LAG) and a plurality of communication ports, each communication port configured to couple the first network switching unit to the second network switching unit using a corresponding network link selected from a plurality of network links, and wherein the plurality of network links are assigned to the LAG. The method further includes determining whether the link deactivation request is acceptable, in response to determining that the link deactivation request is not acceptable, denying the link deactivation request, in response to determining that the link deactivation request is acceptable, confirming the link deactivation request, determining a first network link selected from the plurality of network links to deactivate, deactivating the first network link from use by the LAG, and reducing power supplied to the first network link.

According to yet another embodiment, an information handling system includes a first network switching unit. The first network switching unit includes a link aggregation group (LAG) and a plurality of communication ports, each communication port configured to couple the first network switching unit to a second network switching unit using a corresponding network link selected from a plurality of network links, and wherein the plurality of network links are assigned to the LAG. The first network switching unit is configured to detect whether conditions are suitable for reducing power consumption, request network link deactivation by sending a link deactivation request to the second network switching unit, determine whether the link deactivation request is approved, determine a first network link selected from the plurality of network links to deactivate, deactivate the first network link from use by the LAG, and reduce power supplied to the first network link.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1A:
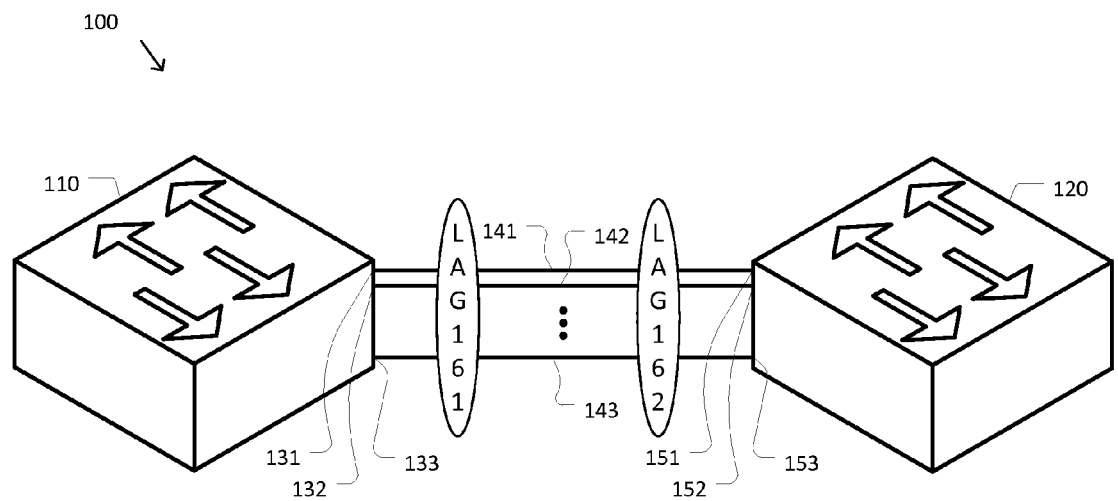
FIG. 1a shows a simplified diagram of a network according to some embodiments.

FIG. 1a shows a simplified diagram of a network 100 according to some embodiments. As shown in FIG. 1a, the network 100 may include a network switching unit 110 and a network switching unit 120. The network switching unit 110 may include one or more communication ports 131-133. Each of the one or more communication ports 131-133 may be coupled to a corresponding one of one or more network links 141-143. Communication port 131 may be coupled to network link 141, communication port 132 may be coupled to network link 142, and communication port 133 may be coupled to network link 143. The network switching unit 120 may include one or more communication ports 151-153. Each of the one or more communication ports 151-153 may be coupled to a corresponding one of the one or more network links 141-143. Communication port 151 may be coupled to network link 141, communication port 152 may be coupled to network link 142, and communication port 153 may be coupled to network link 143.

Network switching unit 110 may route network traffic to network switching unit 120 by sending it to any one of the communication ports 131-133 where it is sent on the corresponding one of the network links 141-143 toward network switching unit 120. Similarly, network switching unit 120 may route network traffic to network switching unit 110 by sending it to any one of the communication ports 151-153 where it is sent on the corresponding one of the network links 141-143 toward network switching unit 110. Thus, the network links 141-143 can provide parallel and alternative network paths between the network switching unit 110 and the network switching unit 120. The parallel nature of the network links 141-143 may be formalized in each of the network switching units 110 and 120 through the use of link aggregation groups. Network switching unit 110 may group the network links 141-143 into a LAG 161. When network switching unit 110 desires to route network traffic to network switching unit 120 it may route the network traffic using LAG 161, leaving the decision of which of the network links 141-143 and corresponding communication ports 131-133 to use to a LAG hashing algorithm. Similarly, network switching unit 120 may group the network links 141-143 into a LAG 162. When network switching unit 120 desires to route network traffic to network switching unit 110 it may route the network traffic using LAG 162.

Because network utilization may change based on the amount of network traffic being routed and/or the source(s) and destination(s) of the network traffic, the amount of network traffic that needs to be handled by network links 141-143 may increase or decrease. A network designer may generally choose the number of parallel network links 141-143 between the network switches 110 and 120 based on an expected maximum traffic load to reduce a potential for a loss of network traffic. However, there may be times when the actual traffic load being handled by network links 141-143 may be significantly less than the expected maximum traffic load or even non-existent. A ratio of the actual traffic load to a maximum traffic load that can be handled by a LAG is often referred to as the utilization for the LAG. A low utilization may indicate a low traffic load and a high utilization may indicate a high traffic load. In some embodiments, where there is an extended period of time where the utilization is low, it may be advantageous to deactivate one or more of the network links in a LAG to reduce power consumption. In some embodiments, it may be advantageous to reduce power consumption in the LAG for other reasons. In some embodiments, power consumption may be reduced to lower a need for heat dissipation and to lower the temperature of the network switching units 110 and 120. In some embodiments, power consumption may be reduced to lower a peak power demand. In some embodiments, power consumption may be reduced based on a time of day.

Figure 1B:
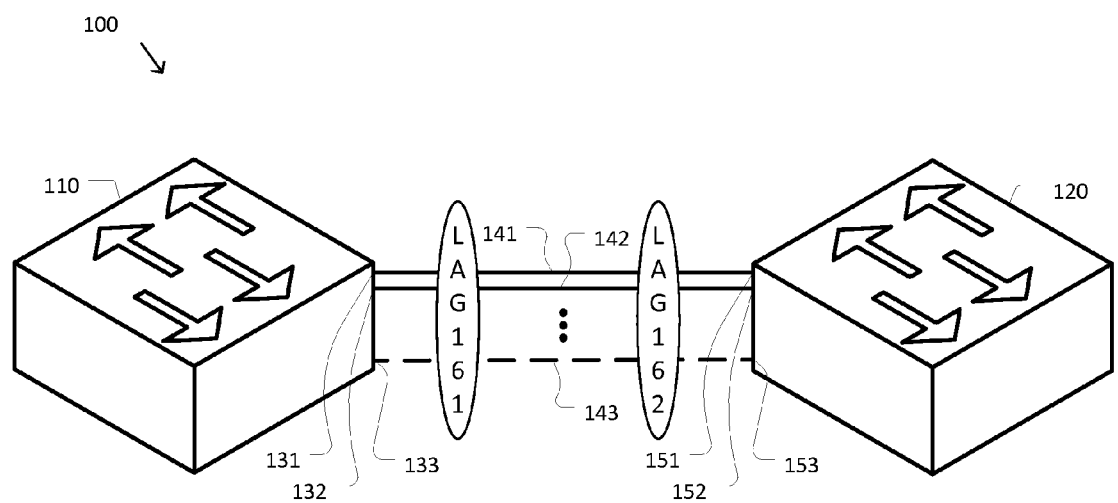
FIG. 1b shows a simplified diagram of the network with a network link deactivated according to some embodiments.

FIG. 1*b* shows a simplified diagram of the network 100 with the network link 143 deactivated according to some embodiments. As shown in FIG. 1*b*, the network link 143 has been deactivated to reduce, for example, power consumption. Network traffic may now only move between the network switching units 110 and 120 using network links 141 and 142. Network link 143 may also be deactivated for use in LAGs 161 and 162 so that the LAG hashing algorithms of network switching units 110 and 120 will not route network traffic using network link 143. Because network link 143 is deactivated, network switching unit 110 may reduce or remove power from network link 143. In some embodiments, network switching unit 110 may also reduce or remove power from communication port 133. In some embodiments, network switching unit 110 may also reduce or remove power from other circuitry associated with communication port 133 and/or network link 143. Network switching unit 120 may similarly reduce or remove power from network link 143, communication port 153, and/or other circuitry associated with communication port 153 and/or network link 143. Thus, the overall power consumption of the network switching units 110 and 120, as well as the network 100 may be reduced.

As discussed above and further emphasized here, FIGS. 1*a* and 1*b* are merely examples, which should not unduly limit the scope of the claims. One of ordinary skill in the art would recognize many variations, alternatives, and modifications. According to some embodiments, there may be fewer than three or more than three network links 141-143 coupling the network switching units 110 and 120.

Figure 2:
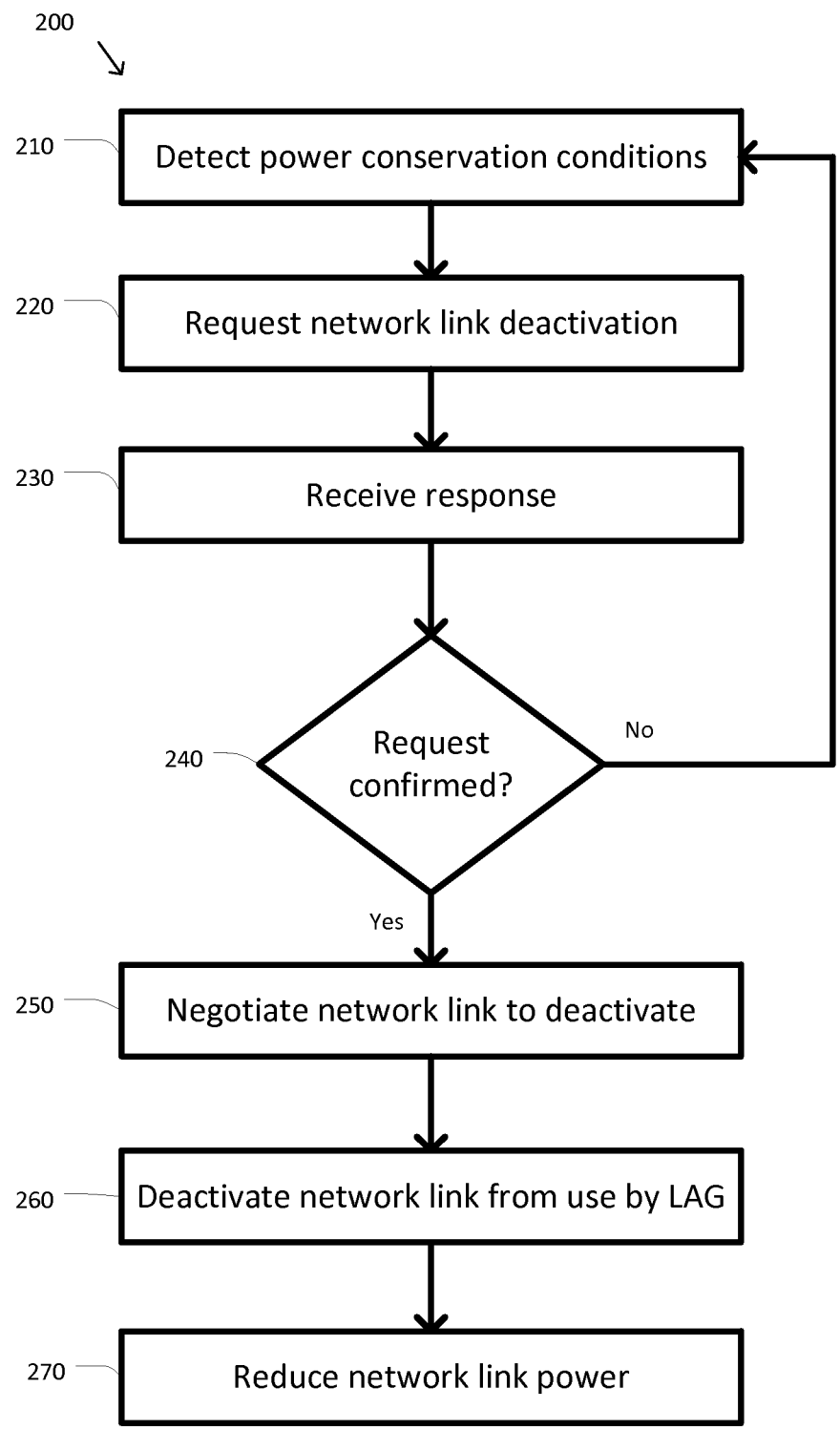
FIG. 2 shows a simplified diagram of a method of reducing power consumption in a network switching unit according to some embodiments.

FIG. 2 shows a simplified diagram of a method 200 of reducing power consumption in a network switching unit according to some embodiments. As shown in FIG. 2, the method 200 includes a process 210 for detecting power conservation conditions, a process 220 for requesting network link deactivation, a process 230 for receiving a response to the request, a process 240 for determining whether the request was confirmed, a process 250 for negotiating a network link to deactivate, a process 260 for deactivating the network link from use by a LAG, and a process 270 for reducing the network link power. According to certain embodiments, the method 200 of reducing power consumption in a network switching unit can be performed using variations among the processes 210-270 as would be recognized by one of ordinary skill in the art. According to some embodiments, the process 230 is optional and may be omitted. In some embodiments, one or more of the processes 210-270 may be implemented, at least in part, in the form of executable code stored on non-transitory, tangible, machine readable media that when run by one or more processors in one or more network switching units (e.g., the network switching units 110 and/or 120) may cause the one or more processors to perform one or more of the processes 210-270.

At the process 210, a network switching unit (e.g., the network switching unit 110 and/or 120) may detect whether network conditions are suitable for reducing power consumption on one of the network switching unit's LAGs (e.g., the LAG 161 and/or 162). According to some embodiments, power consumption may be reduced when a utilization of the LAG falls below a minimum utilization threshold for a period of time. In some embodiments, the minimum utilization threshold may be 10% or lower. In some embodiments, the minimum utilization threshold may be 20% or lower. In some embodiments, the minimum utilization threshold may be set as part of the configuration of the network switching unit. In some embodiments, the minimum utilization threshold may be set using a configuration utility. In some embodiments, the minimum utilization threshold may be stored in one or more memory devices (e.g., ROM, RAM, PROM, EPROM, FLASH-EPROM, and/or any other memory chip or cartridge) coupled to the network switching unit. In some embodiments, the minimum utilization threshold may be dynamic based on a time of day and/or other network settings and/or conditions. In some embodiments, the period of time may be as short as a second or less. In some embodiments, the period of time may be as short as a minute or less. In some embodiments, the period of time may be 5-10 minutes or more in length. In some embodiments, the period of time may be set as part of the configuration of the network switching unit. In some embodiments, the period of time may be set using a configuration utility. In some embodiments, the period of time may be stored in one or more memory devices (e.g., ROM, RAM, PROM, EPROM, FLASH-EPROM, and/ or any other memory chip or cartridge) coupled to the network switching unit. In some embodiments, the period of time may be dynamic based on a time of day and/or other network settings and/or conditions.

According to some embodiments, power consumption may be reduced when a temperature of the network switching unit exceeds a maximum temperature threshold. In some embodiments, the maximum temperature threshold may be 70 degrees centigrade or higher. In some embodiments, the maximum temperature threshold may be 85 degrees centigrade or higher. In some embodiments, the maximum temperature threshold may be 125 degrees centigrade or higher. In some embodiments, the maximum temperature threshold may be set as part of the configuration of the network switching unit. In some embodiments, the maximum temperature threshold may be set using a configuration utility. In some embodiments, the maximum temperature threshold may be stored in one or more memory devices (e.g., ROM, RAM, PROM, EPROM, FLASH-EPROM, and/or any other memory chip or cartridge) coupled to the network switching unit. In some embodiments, the maximum temperature threshold may be dynamic based on a time of day and/or other network settings and/or conditions.

According to some embodiments, power consumption may be reduced based on a time of day.

According to some embodiments, power consumption may be reduced based on one or more of the factors described above. In some embodiments, any logical and/or temporal combination of the one or more factors may be considered.

At the process 220, the network switching unit makes a request for link deactivation. According to some embodiments, the network switching unit may select a LAG (e.g., the LAG of process 210 whose utilization is below the minimum utilization threshold). In some embodiments, the network switching unit may send a network link deactivation message to a neighboring network switching unit (e.g., the network switching unit 120 and/or 110) using one of the network links (e.g., the network links 140-143) in the LAG. In some embodiments, the link deactivation message may ask the neighboring network switching unit whether it is willing to deactivate one of their shared network links.

At the optional process 230, the network switching unit receives a response to the link deactivation request. According to some embodiments, the network switching unit may receive a response message on one of the network links in the LAG. In some embodiments, the response message may include information indicating whether the neighboring network switching unit is willing to deactivate one of their shared network links.

At the process 240, the network switching unit may determine whether the network link deactivation request is confirmed. According to some embodiments, the network switching unit examines the response message. According to some embodiments, the network deactivation request may not be confirmed when no response message is received. In some embodiments, the network deactivation request may not be confirmed when a response message is not received during a timeout period following the making of the deactivation request. In some embodiments, the timeout period is several milliseconds. In some embodiments, the timeout period is a second or longer. In some embodiments, the timeout period may be set as part of the configuration of the network switching unit. In some embodiments, the timeout period may be set using a configuration utility. In some embodiments, the timeout period may be stored in one or more memory devices (e.g., ROM, RAM, PROM, EPROM, FLASH-EPROM, and/or any other memory chip or cartridge) coupled to the network switching unit. In some embodiments, the timeout period may be dynamic based on a time of day and/or other network settings and/or conditions. If the network switching unit determines that the network link deactivation request has not been confirmed, the method 200 returns to process 210.

At the process 250, the network switching unit and the neighboring network switching unit may negotiate which network link should be deactivated. According to some embodiments, the network link is selected based on a mutually agreed upon criteria. In some embodiments, the network link, from among the active network links, with a largest ID number is selected. In some embodiments, the network link, from among the active network links, with a smallest ID number is selected. According to some embodiments, the network switching unit and the neighboring switching unit may exchange one or more negotiation messages to determine the network link to deactivate.

At the process 260, the network switching unit may deactivate the network link from use by the LAG. According to some embodiments, the network link may be removed from consideration by a LAG hashing algorithm used to select from among the network links associated with the LAG.

At the process 270, the network switching unit may reduce power provided to the network link. According to some embodiments, the network switching unit may reduce some power or remove all power to the network link. According to some embodiments, the network switching unit may reduce or remove power from a communication port (e.g., one of the communication ports 131-133 and/or 151-153) corresponding to the network link. According to some embodiments, the network switching unit may also reduce or remove power from other circuitry associated with the communication port and/or the network link.

As discussed above and further emphasized here, FIG. 2 is merely an example, which should not unduly limit the scope of the claims. One of ordinary skill in the art would recognize many variations, alternatives, and modifications. According to some embodiments, upon completion of the process 270, the method 200 may return to process 210 to determine whether one or more additional network links may be deactivated.

Figure 3:
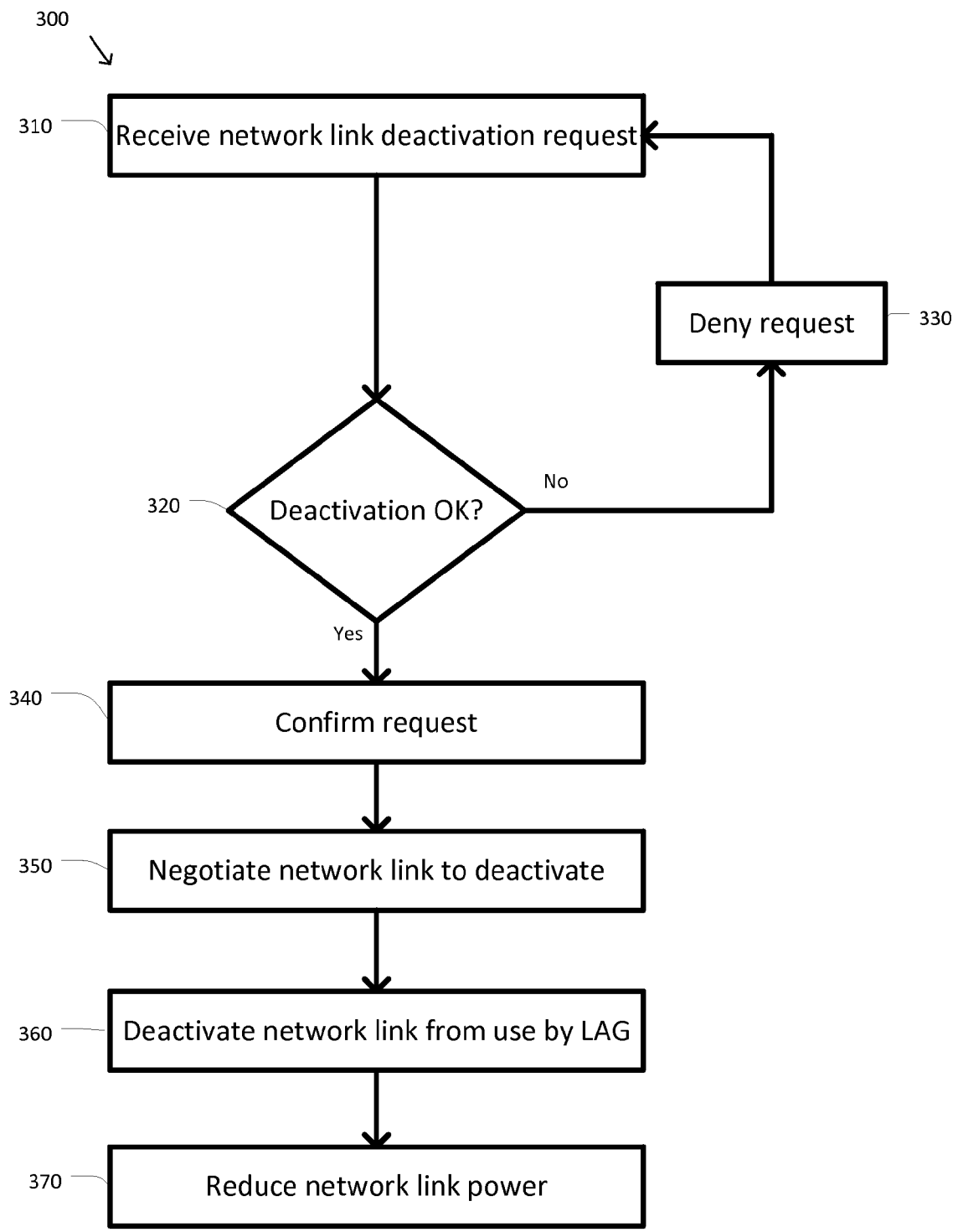
FIG. 3 is a simplified diagram of a method of reducing power consumption in a network switching unit according to some embodiments.

FIG. 3 is a simplified diagram of a method 300 of reducing power consumption in a network switching unit according to some embodiments. As shown in FIG. 3, the method 300 includes a process 310 for receiving a network link deactivation request, a process 320 for determining whether deactivation of a network link is acceptable, a process 330 for denying the request, a process 340 for confirming the request, a process 350 for negotiating a network link to deactivate, a process 360 for deactivating the network link from use by a LAG, and a process 370 for reducing the network link power. According to certain embodiments, the method 300 of reducing power consumption in a network switching unit can be performed using variations among the processes 310-370 as would be recognized by one of ordinary skill in the art. According to some embodiments, the process 330 is optional and may be omitted. In some embodiments, one or more of the processes 310-370 may be implemented, at least in part, in the form of executable code stored on non-transient, tangible, machine readable media that when run by one or more processors in one or more network switching units (e.g., the network switching units 110 and/or 120) may cause the one or more processors to perform one or more of the processes 310-370.

At the process 310, a network switching unit (e.g., the network switching unit 110 and/or 120) may receive a network link deactivation request. In some embodiments, the network link deactivation request may be the network link deactivation request from process 220. In some embodiments, the network link deactivation request may be in the form of a network link deactivation message sent by a neighboring network switching unit (e.g., the network switching unit 120 and/or 110) using one of the network links (e.g., the network links 140-143) in a LAG (e.g., the LAG 162 and/or 161).

At the process 320, the network switching unit determines whether deactivation of a network link is acceptable. According to some embodiments, the network switching unit may make its determination using one or more factors similar to the one or more factors used in the process 210 to detect whether network conditions are suitable for reducing power consumption. In some embodiments, the network switching unit may consider a utilization of the LAG. In some embodiments, the network switching unit may consider a temperature of the network switching unit. In some embodiments, the network switching unit may consider a time of day. In some embodiments, any logical and/or temporal combination of the one or more factors may be considered. According to some embodiments, the network switching unit may recognize that it has network traffic to route to the neighboring network switching unit that the neighboring network switching may not have been able to consider when it made the network link deactivation request. If the network switching unit determines that deactivation of a network link is not acceptable, the method 300 moves to process 330. Otherwise, the method 300 moves to process 340.

At the optional process 330, the network switching unit denies the deactivation request. According to some embodiments, the network switching unit may send a response message on one of the network links in the LAG. In some embodiments, the response message may include information indicating that the network switching unit is not willing to deactivate one of its network links. In some embodiments, the response message may be the response received by the neighboring network switching device in process 230.

At the process 340, the network switching unit confirms the deactivation request. According to some embodiments, the network switching unit may send a response message on one of the network links in the LAG. In some embodiments, the response message may include information indicating that the network switching unit is willing to deactivate one of its network links. In some embodiments, the response message may be the response received by the neighboring network switching device in process 230.

At the process 350, the network switching unit and the neighboring network switching unit may negotiate which network link should be deactivated. According to some embodiments, the network link is selected based on a mutually agreed upon criteria. In some embodiments, the network link, from among the active network links, with a largest ID number is selected. In some embodiments, the network link, from among the active network links, with a smallest ID number is selected. According to some embodiments, the network switching unit and the neighboring switching unit may exchange one or more negotiation messages to determine the network link to deactivate. According to some embodiments, the selected network link is the same network link selected in process 250.

At the process 360, the network switching unit may deactivate the network link from use by the LAG. According to some embodiments, the network link may be removed from consideration by a LAG hashing algorithm used to select from among the network links associated with the LAG.

At the process 370, the network switching unit may reduce power provided to the network link. According to some embodiments, the network switching unit may reduce some power or remove all power to the network link. According to some embodiments, the network switching unit may reduce or remove power from a communication port (e.g., one of the communication ports 151-153 and/or 131-133) corresponding to the network link. According to some embodiments, the network switching unit may also reduce or remove power from other circuitry associated with the communication port and/or the network link.

As discussed above and further emphasized here, FIG. 3 is merely an example, which should not unduly limit the scope of the claims. One of ordinary skill in the art would recognize many variations, alternatives, and modifications. According to some embodiments, upon completion of the process 370, the method 300 may return to process 310 to wait for another network link deactivation request. According to some embodiments, upon completion of the process 370, the method 300 may switch to process 210 of method 200 to detect whether network conditions are suitable for reducing power consumption on one of the network switching unit's LAGs.

Figure 4:
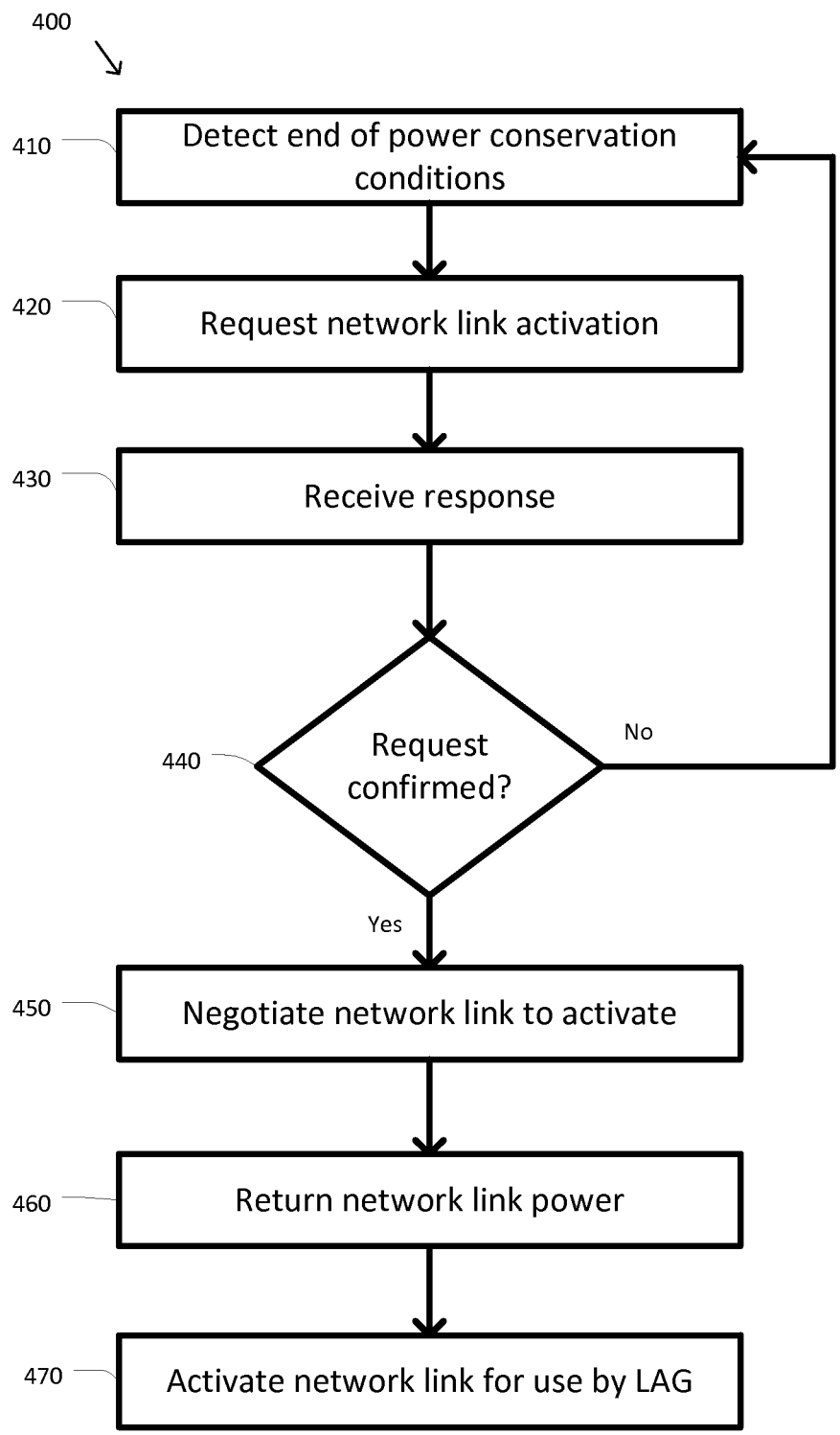
FIG. 4 is a simplified diagram of a method of activating a network link in a network switching unit according to some embodiments.

FIG. 4 is a simplified diagram of a method 400 of activating a network link in a network switching unit according to some embodiments. As shown in FIG. 4, the method 400 includes a process 410 for detecting an end of power conservation conditions, a process 420 for requesting network link activation, a process 430 for receiving a response to the request, a process 440 for determining whether the request was confirmed, a process 450 for negotiating a network link to activate, a process 460 for returning the network link power, and a process 470 for activating the network link for use by a LAG. According to certain embodiments, the method 400 of activating a network link in a network switching unit can be performed using variations among the processes 410-470 as would be recognized by one of ordinary skill in the art. According to some embodiments, the process 430 is optional and may be omitted. In some embodiments, one or more of the processes 410-470 may be implemented, at least in part, in the form of executable code stored on non-transient, tangible, machine readable media that when run by one or more processors in one or more network switching units (e.g., the network switching units 110 and/or 120) may cause the one or more processors to perform one or more of the processes 410-470.

At the process 410, a network switching unit (e.g., the network switching unit 110 and/or 120) may detect an end of power conservation conditions. According to some embodiments, the process 410 may only occur when one or more of the network links (e.g., the network links 141-143) of a LAG (e.g., the LAG 161 and/or 162) are deactivated. In some embodiments, the one or more network links may have been deactivated by the method 200 and/or the method 300. According to some embodiments, the end of power conservation conditions may indicate that network conditions suggest that additional network links should be activated in the LAG. According to some embodiments, the end of power conservation conditions may occur when a utilization of the LAG rises above a maximum utilization threshold for a period of time. In some embodiments, the maximum utilization threshold may be 80% or higher. In some embodiments, the maximum utilization threshold may be 60% or higher. In some embodiments, the maximum utilization threshold may be set as part of the configuration of the network switching unit. In some embodiments, the maximum utilization threshold may be set using a configuration utility. In some embodiments, the maximum utilization threshold may be stored in one or more memory devices (e.g., ROM, RAM, PROM, EPROM, FLASH-EPROM, and/or any other memory chip or cartridge) coupled to the network switching unit. In some embodiments, the maximum utilization threshold may be dynamic based on a time of day and/or other network settings and/or conditions. In some embodiments, the period of time may be as short as a second or less. In some embodiments, the period of time may be as short as a minute or less. In some embodiments, the period of time may be 5-10 minutes or more in length. In some embodiments, the period of time may be set as part of the configuration of the network switching unit. In some embodiments, the period of time may be set using a configuration utility. In some embodiments, the period of time may be stored in one or more memory devices (e.g., ROM, RAM, PROM, EPROM, FLASH-EPROM, and/or any other memory chip or cartridge) coupled to the network switching unit. In some embodiments, the period of time may be dynamic based on a time of day and/or other network settings and/or conditions.

According to some embodiments, the end of power conservation conditions may occur when a temperature of the network switching unit drops below a minimum temperature threshold. In some embodiments, the minimum temperature threshold may be 100 degrees centigrade or lower. In some embodiments, the minimum temperature threshold may be 65 degrees centigrade or lower. In some embodiments, the minimum temperature threshold may be 40 degrees centigrade or higher. In some embodiments, the minimum temperature threshold may be set as part of the configuration of the network switching unit. In some embodiments, the minimum temperature threshold may be set using a configuration utility. In some embodiments, the minimum temperature threshold may be stored in one or more memory devices (e.g., ROM, RAM, PROM, EPROM, FLASH-EPROM, and/or any other memory chip or cartridge) coupled to the network switching unit. In some embodiments, the minimum temperature threshold may be dynamic based on a time of day and/or other network settings and/or conditions.

According to some embodiments, the end of power conservation conditions may occur based on a time of day.

According to some embodiments, the end of power conservation conditions may occur based on one or more of the factors described above. In some embodiments, any logical and/or temporal combination of the one or more factors may be considered.

At the process 420, the network switching unit makes a request for link activation. According to some embodiments, the network switching unit may select a LAG (e.g., the LAG of process 410 whose utilization is above the maximum utilization threshold). In some embodiments, the network switching unit may send a network link activation message to a neighboring network switching unit (e.g., the network switching unit 120 and/or 110) using one of the network links (e.g., the network links 140-143) in the LAG. In some embodiments, the link activation message may ask the neighboring network switching unit whether it is willing to activate one of their shared network links.

At the optional process 430, the network switching unit receives a response to the link activation request. According to some embodiments, the network switching unit may receive a response message on one of the network links in the LAG. In some embodiments, the response message may include information indicating whether the neighboring network switching unit is willing to activate one of their shared network links.

At the process 440, the network switching unit may determine whether the network link activation request is confirmed. According to some embodiments, the network switching unit examines the response message. According to some embodiments, the network activation request may not be confirmed when no response message is received. In some embodiments, the network deactivation request may not be confirmed when a response message is not received during a timeout period following the making of the activation request. In some embodiments, the timeout period is several milliseconds. In some embodiments, the timeout period is a second or longer. In some embodiments, the timeout period may be set as part of the configuration of the network switching unit. In some embodiments, the timeout period may be set using a configuration utility. In some embodiments, the timeout period may be stored in one or more memory devices (e.g., ROM, RAM, PROM, EPROM, FLASH-EPROM, and/or any other memory chip or cartridge) coupled to the network switching unit. In some embodiments, the timeout period may be dynamic based on a time of day and/or other network settings and/or conditions. If the network switching unit determines that the network link activation request has not been confirmed, the method 400 returns to process 410.

At the process 450, the network switching unit and the neighboring network switching unit may negotiate which network link should be activated. According to some embodiments, the network link is selected based on a mutually agreed upon criteria. In some embodiments, the network link, from among the deactivated network links, with a largest ID number is selected. In some embodiments, the network link, from among the deactivated network links, with a smallest ID number is selected. According to some embodiments, the network switching unit and the neighboring switching unit may exchange one or more negotiation messages to determine the network link to activate. According to some embodiments, when only one network link in the LAG is deactivated, it may be selected by default.

At the process 460, the network switching unit may return power to the network link. According to some embodiments, the network switching unit may return power to a communication port (e.g., one of the communication ports 131-133 and/or 151-153) corresponding to the network link. According to some embodiments, the network switching unit may also return power to other circuitry associated with the communication port and/or the network link.

At the process 470, the network switching unit may activate the network link for use by the LAG. According to some embodiments, the network link may be added to consideration by a LAG hashing algorithm used to select from among the network links associated with the LAG.

As discussed above and further emphasized here, FIG. 4 is merely an example, which should not unduly limit the scope of the claims. One of ordinary skill in the art would recognize many variations, alternatives, and modifications. According to some embodiments, upon completion of the process 470, the method 400 may return to process 410 to determine whether one or more additional network links may be activated. According to some embodiments, upon completion of the process 470, the method may switch to method 200 and/or 300 when a reduction in power consumption is desired.

Figure 5:
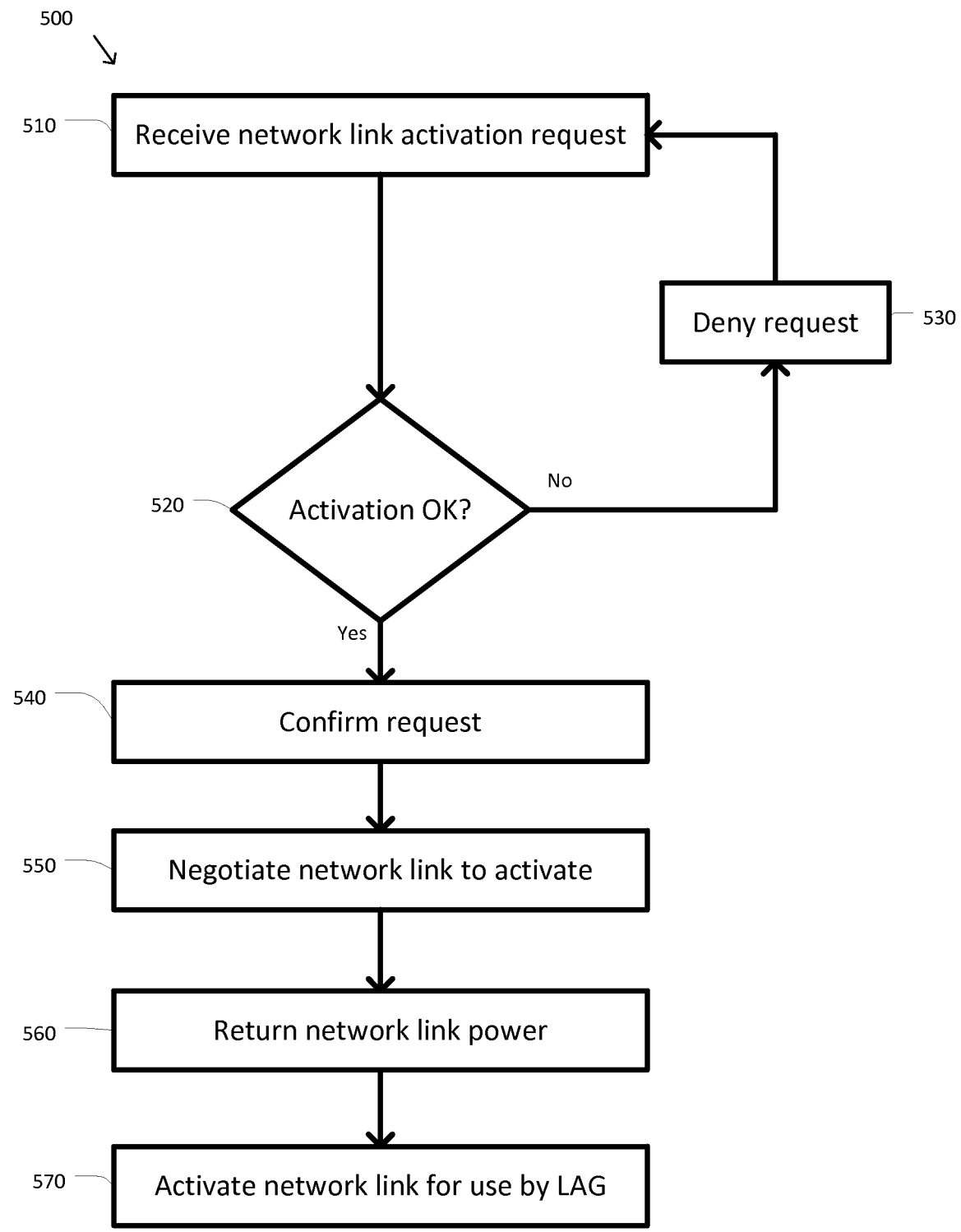
FIG. 5 is a simplified diagram of a method of activating a network link in a network switching unit according to some embodiments.

FIG. 5 is a simplified diagram of a method 500 of activating a network link in a network switching unit according to some embodiments. As shown in FIG. 5, the method 500 includes a process 510 for receiving a network link activation request, a process 520 for determining whether activation of a network link is acceptable, a process 530 for denying the request, a process 540 for confirming the request, a process 550 for negotiating a network link to activate, a process 560 for returning the network link power, and a process 570 for activating the network link for use by a LAG. According to certain embodiments, the method 500 of reducing power consumption in a network switching unit can be performed using variations among the processes 510-570 as would be recognized by one of ordinary skill in the art. According to some embodiments, the process 530 is optional and may be omitted. In some embodiments, one or more of the processes 510-570 may be implemented, at least in part, in the form of executable code stored on non-transient, tangible, machine readable media that when run by one or more processors in one or more network switching units (e.g., the network switching units 110 and/or 120) may cause the one or more processors to perform one or more of the processes 510-570.

At the process 510, a network switching unit (e.g., the network switching unit 110 and/or 120) may receive a network link activation request. In some embodiments, the network link activation request may be the network link activation request from process 420. In some embodiments, the network link activation request may be in the form of a from a network link activation message sent by a neighboring network switching unit (e.g., the network switching unit 120 and/or 110) using one of the network links (e.g., the network links 140-143) in a LAG (e.g., the LAG 162 and/or 161).

At the process 520, the network switching unit determines whether activation of a network link is acceptable. According to some embodiments, the network switching unit may make its determination using one or more factors similar to the one or more factors used in the process 410 to detect whether network conditions are suitable for activating a network link. In some embodiments, the network switching unit may consider a utilization of the LAG. In some embodiments, the network switching unit may consider a temperature of the network switching unit. In some embodiments, the network switching unit may consider a time of day. In some embodiments, any logical and/or temporal combination of the one or more factors may be considered. According to some embodiments, the network switching unit may have an elevated temperature that does not permit activation of a network link. If the network switching unit determines that activation of a network link is not acceptable, the method 500 moves to process 530. Otherwise, the method 500 moves to process 540.

At the optional process 530, the network switching unit denies the activation request. According to some embodiments, the network switching unit may send a response message on one of the network links in the LAG. In some embodiments, the response message may include information indicating that the network switching unit is not willing to activate one of its network links. In some embodiments, the response message may be the response received by the neighboring network switching device in process 430.

At the process 540, the network switching unit confirms the activation request. According to some embodiments, the network switching unit may send a response message on one of the network links in the LAG. In some embodiments, the response message may include information indicating that the network switching unit is willing to activate one of its network links. In some embodiments, the response message may be the response received by the neighboring network switching device in process 430.

At the process 550, the network switching unit and the neighboring network switching unit may negotiate which network link should be activated. According to some embodiments, the network link is selected based on a mutually agreed upon criteria. In some embodiments, the network link, from among the deactivated network links, with a largest ID number is selected. In some embodiments, the network link, from among the deactivated network links, with a smallest ID number is selected. According to some embodiments, the network switching unit and the neighboring switching unit may exchange one or more negotiation messages to determine the network link to activate. According to some embodiments, when only one network link in the LAG is deactivated, it may be selected by default. According to some embodiments, the selected network link is the same network link selected in process 450.

At the process 560, the network switching unit may return power to the network link. According to some embodiments, the network switching unit may return power to a communication port (e.g., one of the communication ports 151-153 and/or 131-133) corresponding to the network link. According to some embodiments, the network switching unit may also return power to other circuitry associated with the communication port and/or the network link.

At the process 570, the network switching unit may activate the network link for use by the LAG. According to some embodiments, the network link may be added to consideration by a LAG hashing algorithm used to select from among the network links associated with the LAG.

As discussed above and further emphasized here, FIG. 5 is merely an example, which should not unduly limit the scope of the claims. One of ordinary skill in the art would recognize many variations, alternatives, and modifications. According to some embodiments, upon completion of the process 570, the method 500 may return to process 510 to wait for another network link activation request. According to some embodiments, upon completion of the process 570, the method 500 may switch to process 410 of method 400 to detect whether network conditions are suitable for activating another network link. According to some embodiments, upon completion of the process 570, the method may switch to method 200 and/or 300 when a reduction in power consumption is desired.

Figure 6:
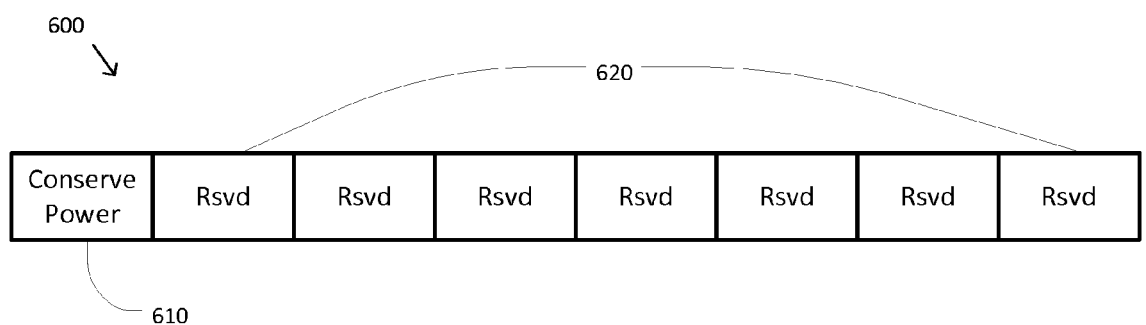
FIG. 6 is a simplified diagram of an extension to an actor and a partner state of a LACP data unit (LACPDU) according to some embodiments.

According to certain embodiments the methods 200, 300, 400, and/or 500 may be implemented using an extension to the Link Aggregation Control Protocol (LACP) as described in the IEEE 802.1AX standard. FIG. 6 is a simplified diagram of an extension 600 to an actor and a partner state of a LACP data unit (LACPDU) according to some embodiments. As shown in FIG. 6, the extension 600 to the actor and/or partner state includes a conserve power bit 610 with the remaining bits 620 being reserved for other uses. The conserve power bit 610 may be used to designate whether a network switching unit (e.g., the actor or the partner) is willing to activate and/or deactivate a network link. According to some embodiments, a conserve power value of the conserve power bit 610 may indicate a willingness to deactivate a network link and a normal power value of the conserve power bit 610 may indicate an unwillingness to deactivate a network link. In some embodiments, the conserve power value may be a logic 1 and the normal power value may be a logic 0.

According to some embodiments, the extension 600 to the actor and partner state may be used in the method 200. At the process 220, the network switching unit (i.e., the actor) may format and send a LACPDU with the actor state extension 600 containing the conserve power value for the conserve power bit 610. By sending the LACPDU with the conserve power bit 610 set to the conserve power value, the network switching unit indicates that it desires a reduction in power. At the process 230, the network switching unit may receive a LACPDU from the neighboring network switching unit (i.e., the partner) with the partner state extension 600. When the partner state extension 600 includes the conserve power value for the conserve power bit 610, the network switching unit may determine that the deactivation request is confirmed during process 240. When the partner state extension 600 includes the normal power value for the conserve power bit 610, the network switching unit may determine that the deactivation request is not confirmed during process 240. At the process 260, the network switching unit may deactivate the network link from use by the LAG by changing a state of the selected network link and/or the corresponding communication port from NORMAL to STANDBY.

According to some embodiments, the extension 600 to the actor and partner state may be used in the method 300. At the process 310, the network switching unit (i.e., the partner) may receive a LACPDU from the neighboring network switching unit (i.e., the actor) with the actor state extension 600 containing the conserve power value for the conserve power bit 610, thus making a link deactivation request. The network switching unit may respond to the link deactivation request by responding with a LACPDU containing a partner state extension 600. By sending the conserve power value as the conserve power bit 610, the network switching unit may confirm the link deactivation request in process 340. By sending the normal power value as the conserve power bit 610, the network switching unit may deny the link deactivation request in process 330. At the process 360, the network switching unit may deactivate the network link from use by the LAG by changing the state of the selected network link and/or the corresponding communication port from NORMAL to STANDBY.

According to some embodiments, the extension 600 to the actor and partner state may be used in the method 400. At the process 420, the network switching unit (i.e., the actor) may format and send a LACPDU with the actor state extension 600 containing the normal power value for the conserve power bit 610. By sending the LACPDU with the conserve power bit 610 set to the normal power value, the network switching unit indicates that it desires to activate a network link. At the process 430, the network switching unit may receive a LACPDU from the neighboring network switching unit (i.e., the partner) with the partner state extension 600. When the partner state extension 600 includes the conserve power value for the conserve power bit 610, the network switching unit may determine that the activation request is not confirmed during process 440. When the partner state extension 600 includes the normal power value for the conserve power bit 610, the network switching unit may determine that the activation request is confirmed during process 440. At the process 470, the network switching unit may activate the network link from use by the LAG by changing a state of the selected network link and/or the corresponding communication port from STANDBY to NORMAL.

According to some embodiments, the extension 600 to the actor and partner state may be used in the method 500. At the process 510, the network switching unit (i.e., the partner) may receive a LACPDU from the neighboring network switching unit (i.e., the actor) with the actor state extension 600 containing the normal power value for the conserve power bit 610, thus making a link activation request. The network switching unit may respond to the link activation request by responding with a LACPDU containing a partner state extension 600. By sending the conserve power value as the conserve power bit 610, the network switching unit may deny the link activation request in process 530. By sending the normal power value as the conserve power bit 610, the network switching unit may confirm the link activation request in process 540. At the process 570, the network switching unit may activate the network link from use by the LAG by changing a state of the selected network link and/or the corresponding communication port from STANDBY to NORMAL.

Some embodiments of network switching units 110 and/or 120 may include non-transient, tangible, machine readable media that include executable code that when run by one or more processors may cause the one or more processors to perform the processes of methods 200, 300, 400, and/or 500 as described above. Some common forms of machine readable media that may include the processes of methods 200, 300, 400, and/or 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network switching unit comprising:
a plurality of communication ports, each communication port coupling the network switching unit to a second network switching unit via a respective network link selected from a plurality of network links; and
a link aggregation group (LAG);
wherein the plurality of network links are grouped to form the LAG;
wherein the network switching unit:
detects whether power consumption may be reduced;
requests deactivation of a network link in the LAG by sending a first link deactivation request to the second network switching unit;
determines whether the first link deactivation request is approved by the second network switching unit;
determines a first network link selected from the plurality of network links to deactivate;
removes the first network link from consideration by a LAG hashing algorithm for the LAG; and
reduces power supplied to the first network link.

2. The network switching unit of claim 1, wherein the network switching unit further receives a response from the second network switching unit.

3. The network switching unit of claim 1, wherein the network switching unit further reduces power to a first communication port selected from the plurality of communication ports, the first communication port being coupled to the first network link.

4. The network switching unit of claim 3, wherein the network switching unit further reduces power to circuitry associated with the first communication port and the first network link.

5. The network switching unit of claim 1, wherein the network switching unit further removes all power supplied to the first network link.

6. The network switching unit of claim 1, wherein the network switching unit further detects whether power consumption may be reduced based on information associated with a utilization of the LAG.

7. The network switching unit of claim 1, wherein the network switching unit further detects whether power consumption may be reduced based on information associated with a temperature of the network switching unit.

8. The network switching unit of claim 1, wherein the network switching unit further detects whether power consumption may be reduced based on information associated with a time of day.

9. The network switching unit of claim 1, wherein the network switching unit further determines the first network link by negotiating with the second network switching unit.

10. The network switching unit of claim 1, wherein the first link deactivation request comprises a Link Aggregation Control Protocol data unit (LACPDU) comprising a conserve power bit.

11. The network switching unit of claim 10 wherein:
the LACPDU includes an actor state extension; and
the actor state extension includes the conserve power bit.

12. The network switching unit of claim 1, wherein the network switching unit further:
detects when power consumption may be ended;
requests activation of a network link by sending a link activation request to the second network switching unit;
determines whether the link activation request is approved by the second network switching unit;
determines a second network link selected from the plurality of network links to activate;
returns power to the second network link; and
activates the second network link for consideration by the LAG hashing algorithm for the LAG.

13. The network switching unit of claim 12, wherein the network switching unit further detects when power consumption may be ended based on information associated with a utilization of the LAG.

14. The network switching unit of claim 12, wherein the network switching unit further detects when power consumption may be ended based on information associated with a temperature of the network switching unit.

15. The network switching unit of claim 12, wherein the first network link and the second network link are the same.

16. The network switching unit of claim 1, wherein the network switching unit further:
   receives a link activation request;
   denies the link activation request when the link activation request is not acceptable; and
   when the link activation request is acceptable:
      confirms the link activation request;
      determines a second network link selected from the plurality of network links to activate;
      returns power to the second network link; and
      activates the second network link for consideration by the LAG hashing algorithm for the LAG.

17. The network switching unit of claim 1, wherein the network switching unit further:
   receives a second link deactivation request from the second network switching unit;
   denies the second link deactivation request when the second link deactivation request is not acceptable;
   when the second link deactivation request is acceptable:
      confirms the second link deactivation request;
      determines a second network link selected from the plurality of network links to deactivate;
      removes the second network link from consideration by the LAG hashing algorithm for the LAG; and
      reduces power supplied to the second network link.

18. A network switching unit comprising:
   a plurality of communication ports, each communication port coupling the network switching unit to a second network switching unit via a respective network link selected from a plurality of network links; and
   a link aggregation group (LAG);
   wherein the plurality of network links are grouped to form the LAG;
   wherein the network switching unit:
      receives a link deactivation request from a second network switching unit;
      denies the link deactivation request when the link deactivation request is not acceptable; and
      when the link deactivation request is acceptable:
         confirms the link deactivation request;
         determines a first network link selected from the plurality of network links to deactivate;
         removes the first network link from consideration by a LAG hashing algorithm for the LAG; and
         reduces power supplied to the first network link.

19. The network switching unit of claim 18, wherein the network switching unit further:
   receives a link activation request;
   denies the link activation request when the link activation request is not acceptable; and
   when the link activation request is acceptable:
      confirms the link activation request;
      determines a second network link selected from the plurality of network links to activate;
      returns power to the second network link; and
      activates the second network link for consideration by the LAG hashing algorithm for the LAG.

20. A non-transitory machine-readable medium comprising a plurality of machine-readable instructions which, when executed by one or more processors associated with a first network switching unit, cause the one or more processors to perform a method comprising:
   detecting when conditions are suitable for reducing power consumption in the first network switching unit, the first network switching unit comprising a plurality of communication ports, each communication port coupling the first network switching unit to a second network switching unit via a respective network link selected from a plurality of network links, the plurality of network links being grouped to form a link aggregation group (LAG);
   requesting deactivation of a network link in the LAG by sending a link deactivation request to the second network switching unit;
   determining whether the link deactivation request is approved by the second network switching unit;
   determining a first network link selected from the plurality of network links to deactivate;
   removing the first network link from consideration by a LAG hashing algorithm for the LAG; and
   reducing power supplied to the first network link.

* * * * *